(No Model.) 2 Sheets—Sheet 1.

F. H. SHERIDAN.
BOOKCASE.

No. 516,774. Patented Mar. 20, 1894.

Witnesses.
Chas. T. Howell.
Laura Shauffer.

Inventor.
Frank H. Sheridan
By Fred W. Bond
Attorney (No Model.) 2 Sheets—Sheet 2.

F. H. SHERIDAN.
BOOKCASE.

No. 516,774. Patented Mar. 20, 1894.

Witnesses
Chas. T. Howell
Laura Sheaffer

Inventor
Frank H. Sheridan
By Fred W. Bond
Attorney

UNITED STATES PATENT OFFICE.

FRANK H. SHERIDAN, OF CANTON, OHIO.

BOOKCASE.

SPECIFICATION forming part of Letters Patent No. 516,774, dated March 20, 1894.

Application filed May 29, 1893. Serial No. 475,851. (No model.)

*To all whom it may concern:*

Be it known that I, FRANK H. SHERIDAN, a citizen of the United States, residing at Canton, in the county of Stark and State of Ohio, have invented certain new and useful Improvements in Bookcases; and I do hereby declare that the following is a full, clear, and exact description of the same, reference being had to the annexed drawings, making a part of this specification, and to the letters of reference marked thereon, in which—

Figure 1:
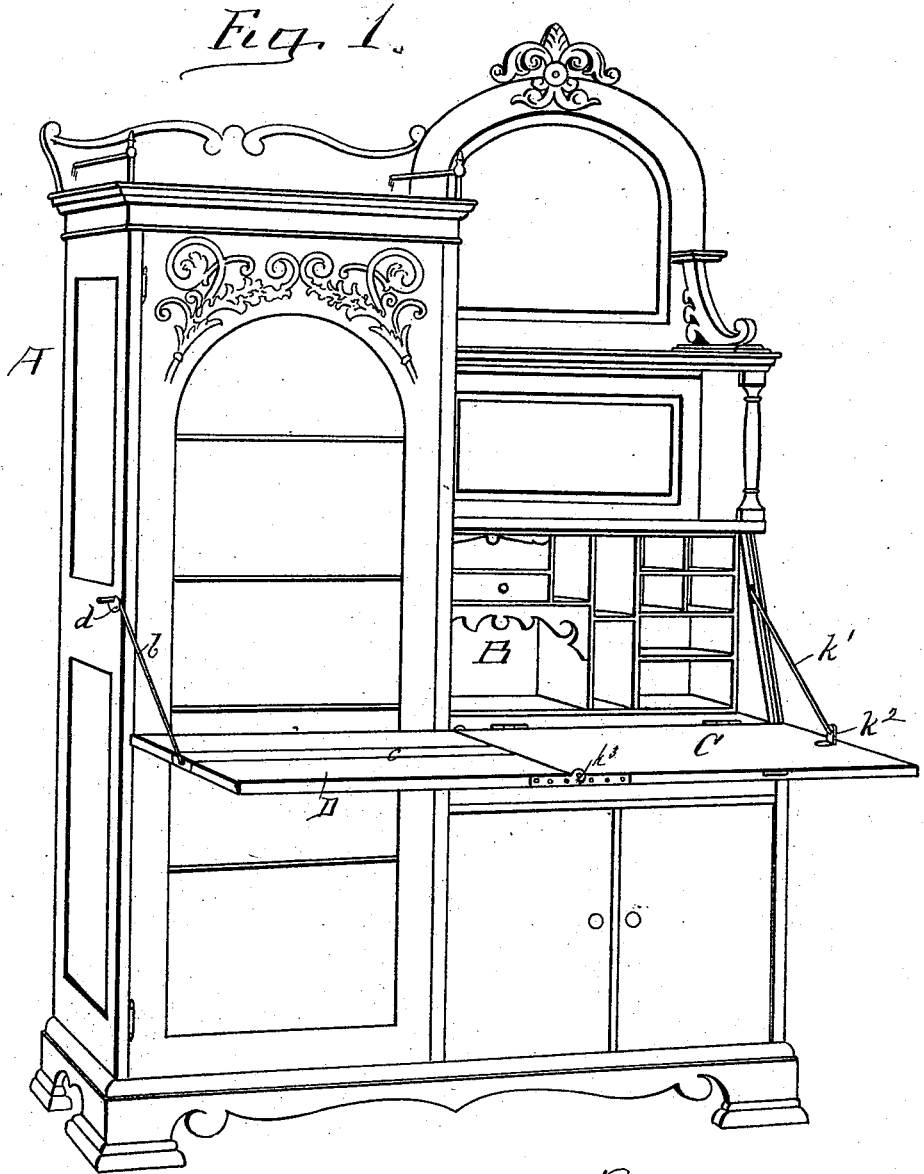
Figure 2:
Figure 3:
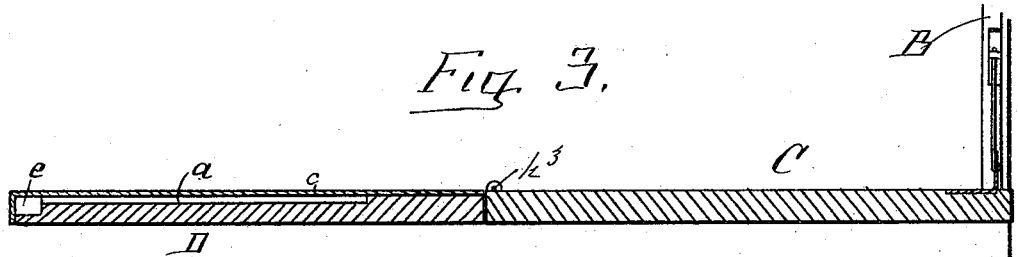
Figure 4:
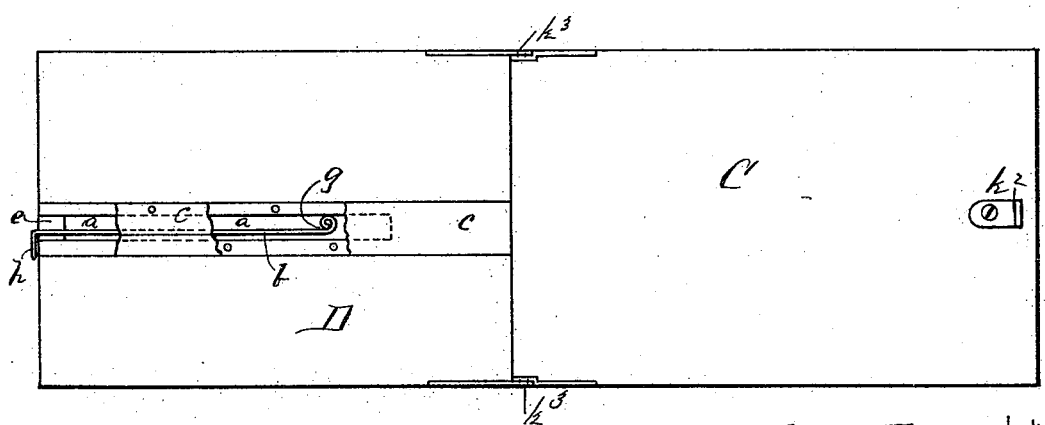
Figure 5:
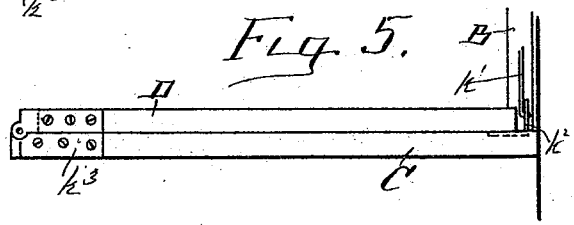
Figure 6:
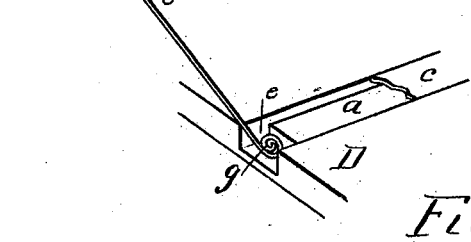
Figure 7:
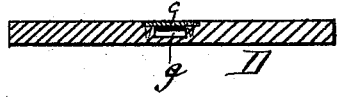
Figure 8:
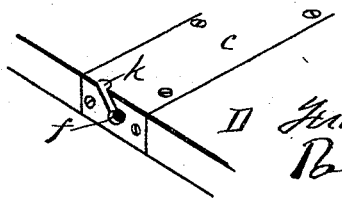

Figure 1, is a front side elevation showing the writing leaf extended. Fig. 2, is a detached view of the leaf holding knob. Fig. 3, is a longitudinal section of the writing table or leaf, showing the same extended or unfolded. Fig. 4, is a top view showing the table or leaf extended. Fig. 5, is a front edge view of the table showing the same folded. Fig. 6, is a view showing a portion of the table or leaf, and illustrating the retaining rod extended. Fig. 7, is a transverse section of the table or leaf. Fig. 8, is an end view showing a portion of the table or leaf, and illustrating the end of said leaf.

The present invention has relation to book cases, and it consists in the different parts and combination of parts hereinafter described and particularly pointed out in the claims.

Similar letters of reference indicate corresponding parts in all the figures of the drawings.

In the accompanying drawings A represents the book case proper, which may be substantially of the form shown in the drawings, or it may be of any other desired style, except so far as the same pertains to my improvement, and the manner of attaching my improvement to the book case proper.

One side of the book case A, may have a secretary or compartment such as B, which compartment may be arranged substantially as shown in Fig. 1, or it may be differently arranged as desired. To the front or forward side of the secretary or compartment B, is hinged the leaf C, which leaf is formed of a length to correspond with the width of the secretary or compartment B, and is located substantially as shown in Fig. 1, when the same is open or extended. To one side of the leaf C is hinged the leaf D, which leaf is of a length to correspond substantially with the book-case A, and when extended for use, is located as shown in Fig. 1. The leaf D, is provided with the groove $a$, which groove is for the purpose of receiving and concealing the supporting rod $b$, when the same is not used for supporting the free end of the leaf.

For the purpose of providing a smooth flat surface upon the top or upper side of the extended leaf, the plate $c$ is provided, which plate is secured to the leaf, and is so adjusted that its top or upper side will come flush with the top or upper side of the extended leaf.

To the end of the book case A, is attached the knob $d$, which knob is located substantially as shown in Fig. 1, and as shown in Fig. 2, it is provided with the notch $d'$, and is for the purpose hereinafter described.

The free end of the leaf D is provided with the chamber $e$, which chamber is inclosed by means of the plate $c$, said plate being bent over the end of the leaf, substantially as illustrated in Figs. 3 and 8. The portion of the plate $c$, which is bent over and upon the end of the leaf D, is provided with the aperture $f$, which aperture is somewhat larger in diameter, than the diameter of the supporting rod $d$, thereby permitting said supporting rod to be easily moved back and forth through the aperture $f$. The inner end of the supporting rod $b$, is provided with the coiled portion or part $g$, which coiled portion or part is for the purpose of forming a stop, and thereby limiting the movement of the supporting rod, and at the same time preventing any accidental displacement of the supporting rod. The outer end of the supporting rod $b$, is provided with the right angled extension or catch $h$, which extension or catch is for the purpose of engaging the notch $d'$, when said supporting rod is placed in the position illustrated in Fig. 1.

For the purpose of providing a means for turning or adjusting the extension or hook $h$, so as to come in proper position to be held by means of the notch $d'$, the chamber $e$ is provided, which chamber is formed of sufficient size, to permit the supporting rod $b$, to be placed at an inclination, as illustrated in Fig. 1.

For the purpose of bringing the supporting rod $b$, substantially flush with the end of the leaf D, the semicircular groove $k$, is provided, which groove is preferably formed in the right angled portion of the plate $c$, and is located at an angle to correspond with the inclination of the supporting rod $b$, when said supporting rod is placed in position to hold the leaf D. It will be understood that by my peculiar manner of supporting the free end of the leaf D, that said leaf will have a rigid support, when the same is extended or unfolded as illustrated in Fig. 1.

When it is desired to fold the leaf D, the supporting rod $b$, is detached from the knob $d$, and its recess $d'$, when the same is free to be entered into the groove $a$, as illustrated in Fig. 3, thereby bringing said supporting rod out of the way, at which time the leaf D, is folded over and on top of the leaf C, after which the two leaves are brought in such a position that they will close the secretary proper.

For the purpose of supporting the outer end of the leaf, the supporting rod $k'$ is provided, which supporting rod is pivotally attached to the flange $k^2$, or its equivalent; its top or upper end being left free to enter the secretary, or one side thereof, as the leaves C and D are folded so as to close the secretary.

For the purpose of bringing the top or upper faces of the leaves C and D in the same plane when they are extended as illustrated in Figs. 1 and 3, the hinges such as $k^3$ are employed to hinge the ends of the sections together; but it will be understood that the form of the hinges may be varied, keeping in mind the object of bringing the upper faces of the leaves in the same plane.

Having fully described my invention, what I claim, and desire to secure by Letters Patent, is—

1. The combination of combined book case and secretary, provided with the hinged desk or leaf C, the leaf D hinged to the leaf C, the plate $c$, the groove $a$ located below the plate $c$, the supporting rod $b$ provided with the extension $h$, and the knob $d$, provided with the notch $d'$, substantially as and for the purpose set forth.

2. The combination of the combined book case and secretary the leaf sections C and D hinged together, the plate $c$ the groove $a$, the chamber $e$, the supporting rod $b$ provided with the part $g$, and the hook $h$, and the knob $d$, substantially as and for the purpose set forth.

3. The combination of a book case and secretary, the hinged leaves C and D, the plate $c$ provided with the groove $k$, the groove $a$ located below the plate $c$, the supporting rod $b$, the knob $d$, and the rod $k'$ substantially as and for the purpose set forth.

In testimony that I claim the above I have hereunto subscribed my name in the presence of two witnesses.

FRANK H. SHERIDAN.

Witnesses:
  JOSIE R. BOND,
  F. W. BOND.